United States Patent [19]

Kile et al.

[11] 4,399,028
[45] Aug. 16, 1983

[54] FROTH FLOTATION APPARATUS AND METHOD

[75] Inventors: Gregory D. Kile, Cincinnati; Larry D. Markham, Middletown; Ronald D. Cruea, Franklin; Derald R. Hatton, Middletown, all of Ohio

[73] Assignee: The Black Clawson Company, Middletown, Ohio

[21] Appl. No.: 388,387

[22] Filed: Jun. 14, 1982

[51] Int. Cl.³ .............................................. C02F 1/24
[52] U.S. Cl. ................................... 209/164; 209/168; 210/703; 210/221.2; 210/776; 210/242.3; 261/87; 261/122
[58] Field of Search .................. 210/221.2, 221.1, 261, 210/262, 703–707, 776, 242.3; 162/4, 55; 209/168, 170, 493, 164; 261/87, 122

[56] References Cited

U.S. PATENT DOCUMENTS

| | | | |
|---|---|---|---|
| 3,545,731 | 12/1970 | McManus | 261/122 |
| 3,650,513 | 3/1972 | Werner | 261/87 |
| 3,817,383 | 6/1974 | Michel et al. | 210/776 |
| 3,911,064 | 10/1975 | McWhirter et al. | 261/87 |
| 3,992,491 | 11/1976 | Ihrig et al. | 261/87 |
| 4,117,048 | 9/1978 | Stockner et al. | 261/93 |
| 4,186,094 | 1/1980 | Hellberg | 210/221.2 |
| 4,190,522 | 2/1980 | Träzl0 | 221.2/ |
| 4,228,112 | 10/1980 | Hise | 261/87 |
| 4,277,328 | 7/1981 | Pfalzer et al. | 261/87 |
| 4,288,319 | 9/1981 | Heijs et al. | 210/221.2 |

Primary Examiner—Benoit Castel
Attorney, Agent, or Firm—Biebel, French & Nauman

[57] ABSTRACT

A froth flotation apparatus for elimination of solid particle impurities contained within a liquid includes a vessel defining a flotation cell which includes an upstanding foam discharge conduit, an inlet conduit communicating with the vessel such that fluid flowing through the inlet conduit and into the vessel moves in a vortical fashion within the vessel, a skimmer, and a sparger. The skimmer consists of a generally cylindrical roller which is rotatably mounted between the discharge conduit and a side wall of the vessel and is buoyant so that it floats on the surface of the fluid within the vessel such that it is rotated by the vortical movement of the fluid within the vessel to prevent buildup of foam and maintain the motion of the fluid within the vessel. The sparger includes a substantially cylindrical porous element mounted on a tubular shaft which is rotatably mounted within the inlet conduit and driven by a motor. Compressed air is forced through the porous element to aerate the fluid entering the vessel. Two or more flotation cells may be arranged in a tower to provide series operation in which the liquid effluent of one cell flows downwardly by gravity into a subsequent cell, thereby eliminating the need for additional mechanical pumps.

19 Claims, 8 Drawing Figures

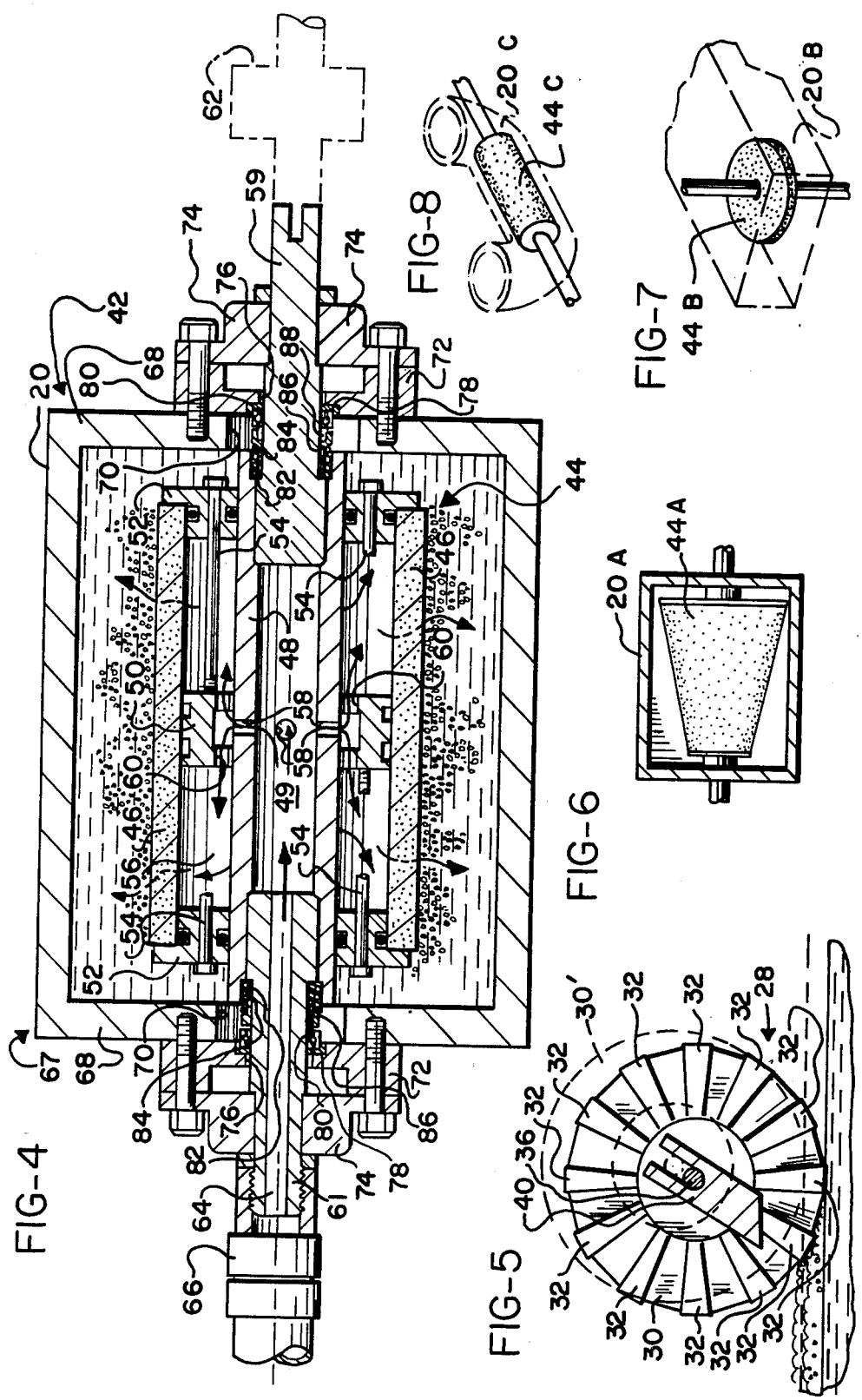

FROTH FLOTATION APPARATUS AND METHOD

BACKGROUND OF THE INVENTION

1. Field of the Invention

The present invention relates to froth flotation apparatuses and, in particular, to froth flotation apparatuses for the deinking of waste paper.

2. Prior Art

The process of froth flotation has many applications, including the separation of minerals from one another, the recovery of oil from oil sands, the removal of particulate contaminants from a liquid, and the flotation of solids from white paper in paper making. Another well known application of the floth flotation process is the deinking of waste paper.

One type of deinking apparatus, known as a deinking cell, includes a cylindrical vessel defining the cell which includes an upstanding reject pipe concentrically mounted within the vessel, a gray stock inlet conduit, and a deinked stock accept outlet conduit which communicates with the bottom of the vessel. A foam removing device, which may consist of a stationary doctor blade, is attached to an inside surface of the vessel wall and extends across the cell at an appropriate height to the mouth of the reject pipe. A blower is mounted to blow air across the doctor blade toward the reject pipe. The inlet conduit includes an aerating apparatus or sparger which creates a multiplicity of air bubbles that attract ink particles, thereby forming a froth or foam which floats upwardly and collects on the surface of the fluid within the cell. The inlet conduit is positioned with respect to the cell such that fluid flowing into the cell through the conduit flows in a vortical pattern about the interior of the vessel, thereby eliminating the need for additional mixing apparatus inside the vessel.

The foam collecting on the surface of the fluid flows around the interior of the vessel with the fluid and is brought into contact with the doctor blade where it collects in a pile. The blade is angled so that the collecting foam is directed along the blade by the blower to the reject pipe and is removed from the cell. The deinked stock flows from the cell through the outlet conduit.

The sparger or mixing chamber consists of a conically shaped portion of the inlet conduit within which is mounted a conical nozzle having perforate walls. The shape of the nozzle matches the shape of the conical conduit section, and the nozzle is adjustably displaceable within the section to bring the perforate walls toward or away from the conical section. The fluid bearing the gray stock is brought around and past the conical nozzle, which communicates with a source of compressed air. The compressed air flows through the nozzle and enters the fluid stream in the form of a multiplicity of fine bubbles. By displacing the nozzle toward the conical walls of the conduit, the overall cross-sectional area of the space between the nozzle and conduit section is descreased, thereby increasing the relative velocity of the fluid with respect to the surface of the nozzle. This increase in fluid velocity causes the bubble size to diminish. The smaller bubbles are able to collect and adhere to ink particles of a sort which cannot be collected by larger bubbles, thereby increasing the efficiency of ink removal.

There are several disadvantages with this type of cell. For example, additional machinery is required to displace the aerating nozzle within the conical conduit section of the sparger, which adds to the overall cost of the apparatus. Another disadvantage of the sparger arises when the nozzle is displaced within the conical conduit section to increase the fluid flow velocity. At this time, the effective area of the conduit is descreased and frictional forces of the fluid against the walls of the conduit and the walls of the aerator are increased, requiring an increased pressure head and necessitating the use of larger-sized pumps, also adding to the overall cost of the apparatus.

The doctor blade of this device also possesses disadvantages. For example, the blade cannot be adjusted to compensate for variations in the fluid level within the cell, so that the fluid level must be maintained within a predetermined range. If the fluid level rises above the level of the blade, the foam is not removed from the surface of the fluid and guided to the reject pipe. If the fluid level drops below the level of the blade, the efficiency of the operation is decreased since foam may pass beneath the blade.

Furthermore, the doctor blade may become coated with foam which would necessitate periodic cleaning. In addition, the blade acts to smooth the surface of the fluid within the vessel, thereby increasing the likelihood of flocculation of pulp on the surface of the fluid.

It is also known to arrange a plurality of the aforementioned cells in series in a stacked relation, known as a tower. For example, U.S. Pat. No. 4,186,094 discloses a tower in which the lowermost cell functions as the primary cell and receives gray stock from the source to perform a first froth flotation process. The outlet conduit which conveys the partially deinked pulp is joined to the cell immediately above it where it is subjected to a second froth flotation process, and so on. A disadvantage with such towers is that the placement of the primary cell as the lowermost cell requires additional mechanical pumps to lift the effluent to higher cells, adding to the cost of the system.

In applications other than froth flotation processes, it is known to utilize a skimming apparatus which is buoyant so that it floats upon the surface of the fluid skimmed. For example, in U.S. Pat. Nos. 4,054,520 and 4,166,036, there is disclosed skimming apparatus for removal of scum or other contaminated particles from the surface of a liquid contained in a tank. In both applications, the skimming apparatus is displaced across the surface of the fluid within the tank, causing the material floating on the surface of the fluid to be pushed to one side where it flows to a trough or other removal apparatus. However, such devices are disclosed as used with tanks of a rectangular shape, and would be unsuitable for the cylindrical tanks of a froth flotation apparatus. Furthermore, the complexity of such displaceable floating skimmers would greatly add to the overall cost of the system.

Accordingly, there is a need for a froth flotation apparatus in which the size of the bubbles forming the foam can be varied to maintain a predetermined size so that a particular type of ink may be removed. There is also a need for a froth flotation apparatus having foam removing apparatus which is automatically raised or lowered as the fluid level within the cell raises or lowers, which does not increase flocculation within the cell, or which requires frequent cleaning. Furthermore, there is a need for a froth flotation system of a plurality of cells in series which does not require mechanical pumping means between cells to maintain a sufficient pressure head to perform the flotation process for each cell.

SUMMARY OF THE INVENTION

The present invention provides a froth flotation apparatus which utilizes a novel skimmer for foam removal which rises and falls with changes in the fluid level within the vessel, thereby increasing the overall performance of the froth flotation apparatus. The present invention also includes a novel sparger which can be used to vary the size of the bubbles generated to form the foam without changing the velocity or flow rate of the fluid entering the cell. Thus, relatively high powered fluid pumps are not required to maintain sufficient pressure head of fluid flowing into the cell when the generation of small bubbles is desired. Furthermore, the present invention provides a system of froth flotation devices which are arranged to form a tower such that the effluent of one cell containing the partially separated material is fed into the next cell by gravity flow, thus eliminating the need for mechanical pumps between cells.

Although the present invention can be used for any of the aforementioned types of froth flotation processes, it is particularly suitable for the deinking of paper pulp. Accordingly, the invention will be described as a froth flotation apparatus used as a deinking cell, with the understanding that this is for purposes of explanation and does not limit the scope of the invention.

The present invention is a froth flotation apparatus which includes a vessel having a generally cylindrical side wall defining a flotation cell and includes an upstanding foam discharge conduit mounted concentrically within the vessel, an inlet conduit communicating with the vessel, a skimmer, and a sparger located in the inlet conduit for aerating fluid flowing through the inlet conduit into the vessel. The inlet conduit joins the vessel such that fluid flowing through the inlet conduit and into the vessel moves in a vortical fashion in the vessel, thereby bringing foam on the surface of the fluid into contact with the skimmer.

The sparger preferably consists of a generally cylindrical porous element mounted on a tubular shaft which extends across and is rotatably mounted to the inlet conduit proximate the inlet opening of the vessel. The tubular shaft is hollow and includes a plurality of holes which communicate with the interior portion of the porous element. The tubular shaft also includes a pair of end stubs, one of which is hollow and communicates with a source of compressed air through a rotary union. Air may be pumped into the tubular shaft and through the porous element to generate the bubbles in the fluid flowing in the inlet conduit.

The sparger also includes a reversible, variable speed motor which is mechanically linked to the other end stub and is capable of rotating the porous element in either direction at any one of a predetermined range of rotational speeds. By rotating the porous element within the inlet conduit, the relative velocity of the fluid flowing in the inlet conduit with respect to the surface of the porous element is increased, which tends to decrease the size of the bubbles generated. Thus, bubble size may be varied for a predetermined range of fluid flow rates without varying the velocity of fluid flow. The conduit housing the porous element may be sized so that a relatively moderate pressure head is required to operate the cell, thereby eliminating the need for a relatively high-powered pump and keeping the overall cost of the system to a minimum.

The porous element preferably is cylindrical in shape and is mounted such that its axis of rotation is normal to the direction of fluid flow through the inlet conduit. Other configurations of rotating porous elements may be utilized and not depart from the scope of the invention. For example, a generally cylindrically shaped porous element may be utilized having an axis of rotation which is parallel to the direction of fluid flow. In another embodiment, a porous element having a generally frustoconical shape may be utilized, having an axis of rotation normal to the direction of fluid flow. In a third embodiment, a disk-shaped element which is porous over its entire surface is mounted within the inlet conduit and rotated about an axis normal to the direction of fluid flow. In each embodiment, the size of the bubbles generated can be decreased by increasing the rotational velocity of the porous element. Different operating characteristics can be created by varying the shape of the porous element.

The skimmer of the invention consists of a generally cylindrical roller which is rotatably mounted within the vessel and extends from the foam discharge conduit to the cylindrical side wall of the vessel, and is angled with respect to the vortical flow path of the foam and fluid within the vessel to direct foam to the discharge conduit. The cylindrical roller is held in position by a pair of guides which permit the roller to rise and fall with the fluid level within the vessel. The roller preferably is buoyant so that it floats upon the surface within the vessel and automatically rises and falls with a change in depth of fluid within the vessel.

In operation, foam floating on the fluid in the vessel flows in a vortical path about the discharge conduit and is brought into contact with the roller. The passage of fluid beneath the roller causes the roller to rotate so that foam is not permitted to collect on any given portion of the roller. Thus, the roller performs a self-cleaning function and does not require frequent manual cleaning. In a preferred embodiment, the roller includes a plurality of raised ribs spaced about its periphery and oriented parallel to the axis of rotation. The raised ribs impart a turbulence to the surface of the water during rotation of the roller so that motion of the fluid near its surface is maintained, thereby reducing the likelihood of fiber flocculation on the surface of the fluid.

The froth flotation cells of the invention can be arranged to form a tower such that successive froth flotation deinking can be performed on a given quantity of pulp slurry. In the preferred embodiment, the primary cell is the topmost cell of the tower and receives the untreated pulp slurry from a remote source. The froth flotation procedure occurs as previously described, and the partially deinked pulp slurry passes from the topmost primary cell through an outlet accepts conduit downwardly to the inlet conduit of a second flotation cell where a second deinking process occurs. The effluent of the second cell is conveyed by an outlet conduit which transports the effluent downwardly to the inlet conduit of a third cell, and so on until the pulp slurry is sufficiently deinked.

Thus, the pulp slurry flows by gravity from the primary or topmost cell to successive cells in the tower, and additional pumping means are not required to maintain sufficient pressure head in the lower cells to permit the froth flotation process to occur. The tower of the present invention provides a cost savings over prior art towers in which the primary cell is the lowermost cell of the tower. In addition, a space savings is provided in that additional plumbing required to convey fluid to to higher towers is not needed.

The inlet conduit to each cell of the tower preferably includes a sparger of the preferred embodiment. Each sparger may then be operated at a different rotational speed, thereby generating bubbles of different sizes. Since the size of a bubble determines the type of particle it will adhere to, different types of inks, fillers, waxes, or other contaminants may be removed from the pulp slurry in each cell. Thus, a tower incorporating a plurality of cells of the present invention may be adjusted to remove a variety of inks from the pulp slurry.

Accordingly, it is an object of the present invention to provide a froth flotation apparatus having a sparger which may be adjusted to provide air bubbles of varying size by increasing the relative velocity of the fluid within the inlet conduit without varying the pressure head required to operate the froth flotation cell; to provide a froth flotation apparatus having a skimmer which is self-cleaning, adjusts automatically to variations in stock depth, and agitates the surface of fluid within the vessel to prevent flocculation of stagnant fiber on the surface; and to provide a froth flotation apparatus which may be arranged in a tower to utilize gravity flow feed to flotation cells other than the primary cell to minimize the overall size and cost of the tower.

These and other objects and advantages of the invention will be apparent from the following description, the accompanying drawings, and the appended claims.

BRIEF DESCRIPTION OF THE DRAWINGS

FIG. 4 is a view of the conduit and sparger of FIG. 3 in which the porous member is shown in section;

FIG. 5 is an end view of the roller of the preferred embodiment showing the roller in a displaced position in phantom in response to a higher fluid level;

FIG. 6 is a detail of an alternate embodiment of the porous member in which the porous member is frusto-conical in shape;

FIG. 7 is a detail of an alternate embodiment of the sparger of the invention in which the porous element is disk-shaped; and FIG. 8 is a detail of an alternate embodiment of a sparger of the invention in which the porous element is cylindrical in shape, having an axis of rotation parallel to the direction of fluid flow.

DESCRIPTION OF THE PREFERRED EMBODIMENTS

Figure 1:
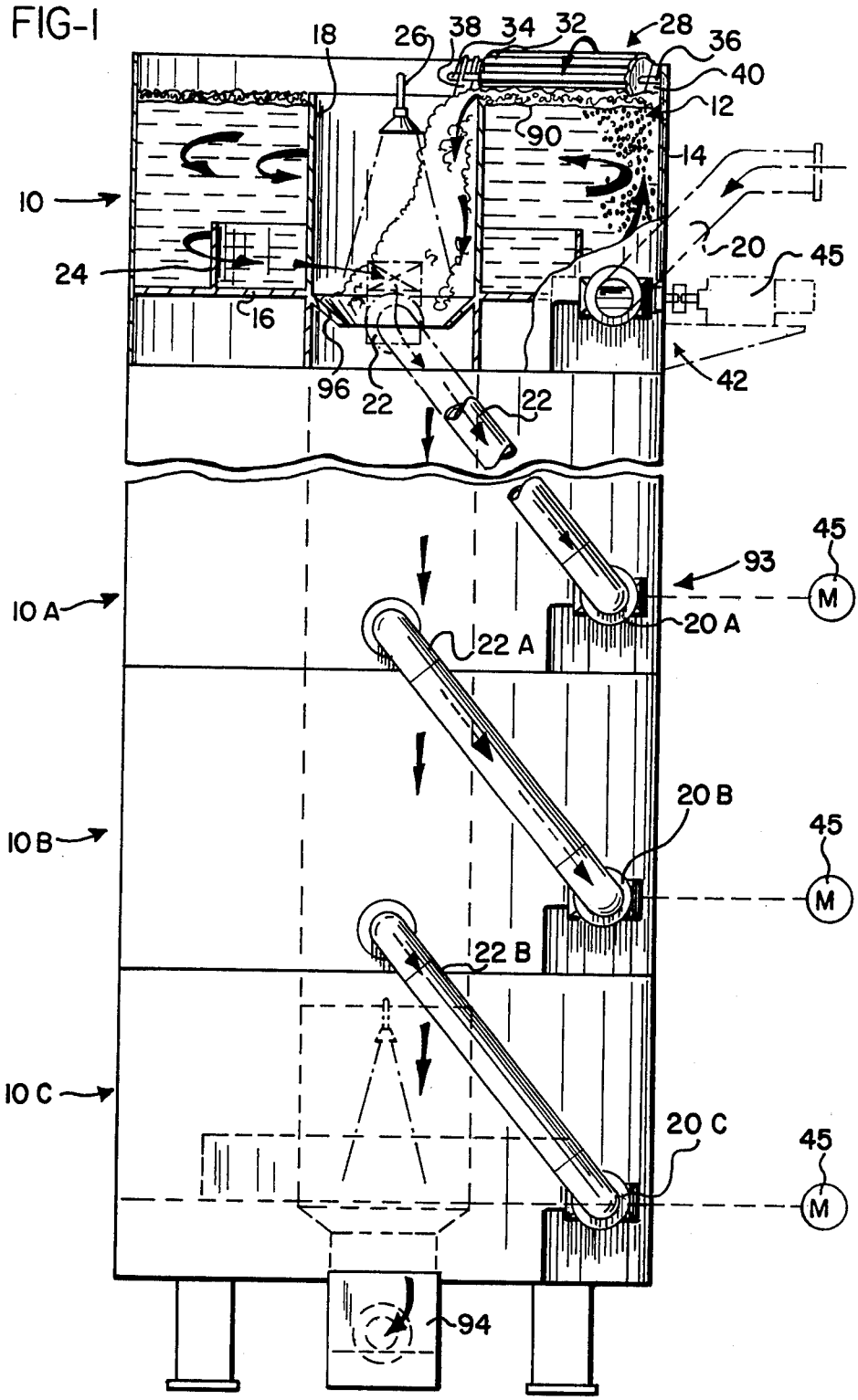
FIG. 1 is an elevation of a froth flotation deinking tower of the preferred embodiment in which the vessel wall of the top or primary cell is partially broken away, and the foam discharge conduit is in section.
Figure 2:
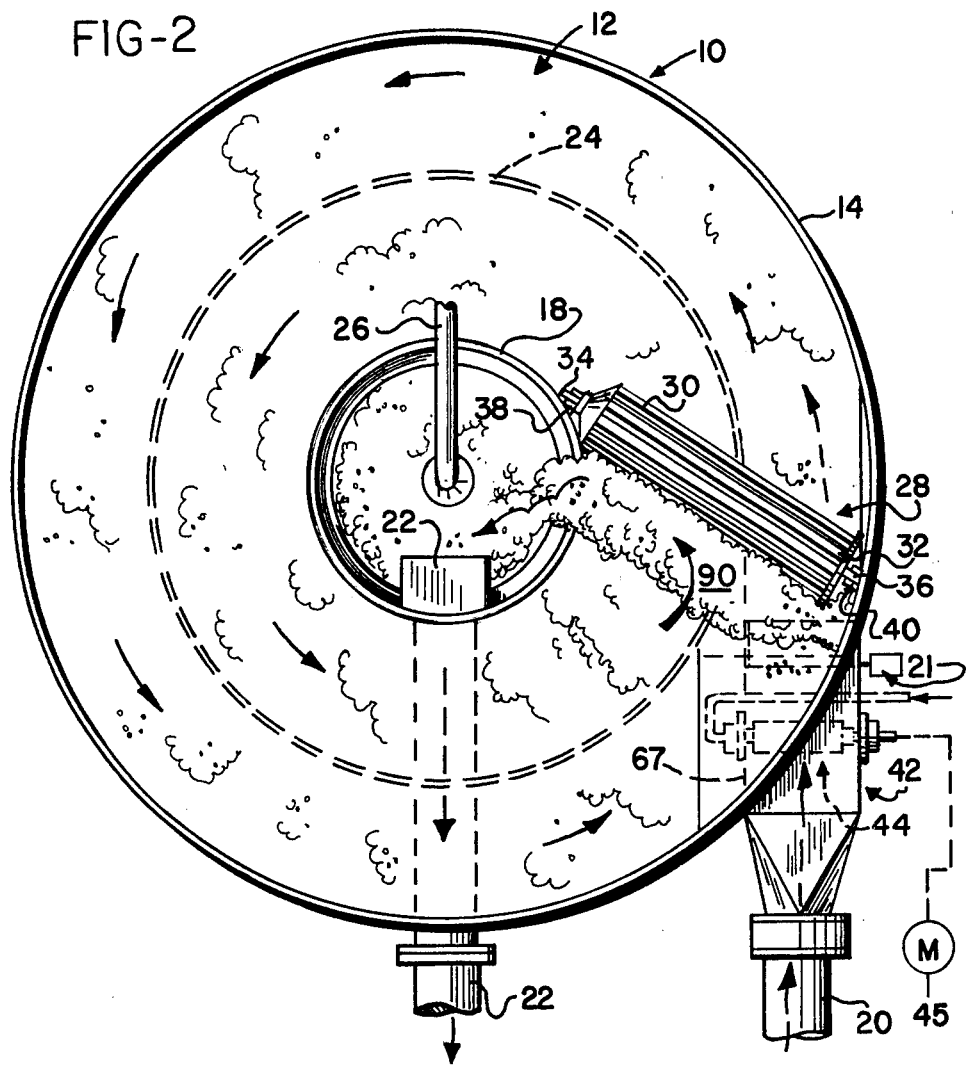
FIG. 2 is a top view of the primary cell of FIG. 1.

As shown in FIGS. 1 and 2, a froth flotation apparatus of the present invention, generally designated 10, includes a generally cylindrical vessel 12 having an annular side wall 14, a floor 16, and an upstanding, generally cylindrical foam discharge conduit 18. A gray stock or pulp slurry inlet conduit 20 is joined to the vessel 12 tangentially with respect to the side wall 14 and near the floor 16 so that fluid flowing through the conduit and into the vessel is curved by the annular wall 14 to travel in a vortical pattern about the foam discharge conduit 18. The inlet conduit 20 includes an adjustable lip 21 of well-known design to vary the effective size of the conduit to adjust fluid flow into the vessel 12. The discharge conduit 18 defines an opening near the floor 16 which communicates with a stock accepts outlet conduit 22. An annular weir 24, concentric with the discharge conduit 18, is mounted to the floor 16 of the vessel 12 and is used to guide the particulates of the fluid within the vessel along the side wall 14 so that they may come in contact with generated bubbles for a sufficient time before entering the accepts outlet conduit 22. The vessel 12 also includes a sprinkler 26, attached to the vessel by conventional means (not shown) which communicates with a remote source of water or other fluid and is used to wash the foam down the walls of the discharge conduit 18.

As best shown in FIGS. 1, 2 and 5, the froth flotation apparatus 10 includes a skimmer 28 which includes a generally cylindrical roller 30 extending between the discharge conduit 18 and an inside surface of the side wall 14 of the vessel 12. The outer surface of the roller 30 includes a plurality of raised ribs 32 which extend along the length of the roller and which are evenly spaced about the outer surface. The roller includes a pair of pins 34, 36 which extends from its ends and defines an axis of rotation parallel with the ribs 32.

The pins 34, 36 are held in a pair of guides 38, 40 which are in the shape of forks to permit the roller 30 to be displaced upwardly or downwardly relative to the guides, yet still be held in position. Guide 38 is mounted to the foam discharge conduit 18, and guide 40 is mounted to the annular side wall of the vessel 12 such that, when supported by the guides, the roller 30 is angled relative to flow within the vessel so that foam collected against the roller is directed to the discharge conduit. In addition, as best shown in FIG. 5, the guide 40, and guide 38 shown in FIGS. 1 and 2, are inclined from the vertical in the direction of fluid flow within the vessel, which would be from left to right, as shown in FIG. 5. The pressure of the fluid against the roller does not cause the pins 34, 36 to bind against the guides 38, 40 and prevent movement of the roller upwardly, to position 30', or downwardly with the fluid level. The roller 30 preferably is buoyant and is made of a plastic such as polyurethane, which is coated with an epoxy for protection.

As shown in FIGS. 1–4, the inlet conduit 20 includes a sparger, generally designated 42. The sparger includes a porous member, generally designated 44, which is rotatably mounted within the inlet conduit 20 and is rotated by a reversible, variable speed electric motor 45. Preferably, the motor is geared to rotate the porous member to speeds as high as 5000 r.p.m.

The porous member 44 includes a generally cylindrical porous element 46 mounted concentrically about a tubular shaft 48 having a hollow interior 49. The porous element 46 is preferably made of sintered bronze having a pore size range of between about 40 and about 70 microns, with an average pore size of about 52 microns. A spacing ring 50 is positioned over the tubular shaft and supports the inside surface of the porous element 46. A pair of end plates 52 are mounted on the tubular shaft 48 and also support the porous element 46. The end plates are held in position by rods 54 which are threaded into the spacing ring 50 and are bolted to the end plates 52. Thus, the porous element 46 and tubular shaft 48 define an interior portion 56.

The tubular shaft 48 includes a plurality of holes 58 which communicate with holes 60 formed in the spacing ring 50 so that the interior 49 of the hollow shaft is continuous with the interior portion 56. The tubular shaft 48 receives end stubs 59, 61 which are press fitted into the ends of the shaft. End stub 59 is adapted to be connected to a coupling 62 of well-known design so that it is operatively joined to the electric motor 45. The end stub 61 defines an opening 64 along its length which communicates with the interior of the tubular shaft 48. The outer end of the end stub is adapted to receive a rotary union 66 which communicates with a remote source of compressed air (not shown).

The inlet conduit 20 includes a section 67 having a rectangular cross-section (FIGS. 1 and 4) which is located beneath the floor 16 of the vessel 12. It is desirable to place the sparger 42 as close as possible to the vessel 12 to prevent the bubbles formed from combining to form larger, unsuitable bubbles upstream from the vessel. The section 67 encloses the sparger 42 and includes side walls 68 which define openings 70 through which the end stubs 59, 61 extend. The chamber may also include vanes (not shown) for straightening fluid flow. The openings 70 are partially closed by cover plates 72 which are bolted to the side walls 68 and support journals 74 which rotatably receive the end stubs 59, 61. The cover plates 72 define openings 76 which are sealed by gaskets 78 that support bearings 80. The end stubs 59, 61 and tubular shaft 48 define annular recesses 82 which receive coil springs 84. The coil springs 84 urge against the annular recess and against first and second cup members 86, 88, which are slidably mounted about the end stubs 59, 61 and are urged against bearings 80.

Thus, the porous member 42 is supported for rotation at opposite ends within the conduit section 67, and is more stable during operation. Another advantage of this support is that there is no need for extensive internal reinforcing and structural members to support the porous member 42 which allows the entire surface area of the porous element 46 to be formed of the sintered bronze or other porous material. Furthermore, the cylindrical shape of the porous element 46 provides a porous surface which is equidistant from the axis of rotation of the member 44 and, therefore, rotates at the same absolute velocity in contrast to a disk-shaped, porous element, for example, which would have a greater variation in absolute velocity across its surface when rotated.

The operation of the froth flotation apparatus is best shown in FIGS. 1-4 and is as follows. If the froth flotation apparatus of the preferred embodiment is used to perform a deinking operation, the pulp slurry or gray stock is pumped through the inlet conduit 20 past the sparger 42 and into the vessel 12. As it passes through the sparger 42, the porous member 44 is rotated by the motor 45, preferably at a speed between 1800 to 2500 r.p.m. and compressed air is pumped into the porous member through the opening 64 in the end stub 61. The compressed air enters the interior 49 of the tubular shaft 48, preferably at between 1 and 25 s.c.f.m., and flows to the interior portion 56 of the porous member 44, and out through the openings of the porous member in the form of a multiplicity of tiny bubbles. Since the porous member 44 is being rotated, the relative velocity of the porous member 44 with respect to the fluid flowing through the conduit 20 is increased, thereby decreasing the size of the bubbles generated. The bubbles are now of an optimum size to attract and adhere to ink particles suspended in the pulp suspension and rise to the surface to form a foam.

Preferably, the size of the porous member and speed of rotation are varied to yield a relative velocity of the surface of the porous element 46 of between 7 and 60 feet per second. With a pore size of between 40 and 70 microns, the bubbles generated will vary in size from 0.25 mm to 10 mm, which is desirable for deinking pulp.

The pulp slurry is pumped into the vessel 12 with sufficient velocity so that it is curved by the annular side wall 14 of the vessel and is guided by the weir 24 so that it follows a vortical path about the foam discharge conduit 18. The foam created by the sparger 42 floats on the surface of the fluid within the vessel 12 and is rotated into contact with the roller 30 where it collects in a pile 90 (FIGS. 1 and 2).

The roller 30 is held in the position shown in FIG. 2 by guides 38, 40 and floats on the surface of the fluid while the fluid passes beneath it in its vortical path within the vessel 14. The movement of the fluid beneath the roller 30 causes the roller to rotate about its central axis defined by pins 34, 36. Thus, the external surface of the roller 30 is rotating downwardly into contact with the foam pile 90, then under the surface of the fluid where the foam collected on the surface of the roller is removed to float back to the surface, then around again to the foam pile. In this fashion, the roller 30 performs a self-cleaning function during the operation of the flotation apparatus 10.

In addition, the raised ribs 32 on the outer surface of the roller impart a turbulence to the surface of the fluid within the vessel 14 which serves to increase the turbidity of the pulp slurry near the surface. This increase in turbidity keeps the surface agitated to prevent flocculation and accumulation of stagnant pulp fiber on the surface.

As shown in FIGS. 1 and 2, once the foam pile 90 reaches a predetermined height, the foam is guided inwardly to the center of the vessel 12 where it falls over the edge of the discharge conduit 18 and downwardly to a drain (not shown). The movement of the foam down the discharge conduit 18 is expedited by the sprinkler 26 which prevents buildup of foam on the walls of the conduit.

The deinked stock accept settles to the bottom of the vessel 12 where it leaves the vessel through the outlet conduit 22. The stock may be recycled back into the vessel 12 or conveyed to subsequent deinking vessels for further deinking if the end product is required to be of high quality and brightness.

Figure 3:
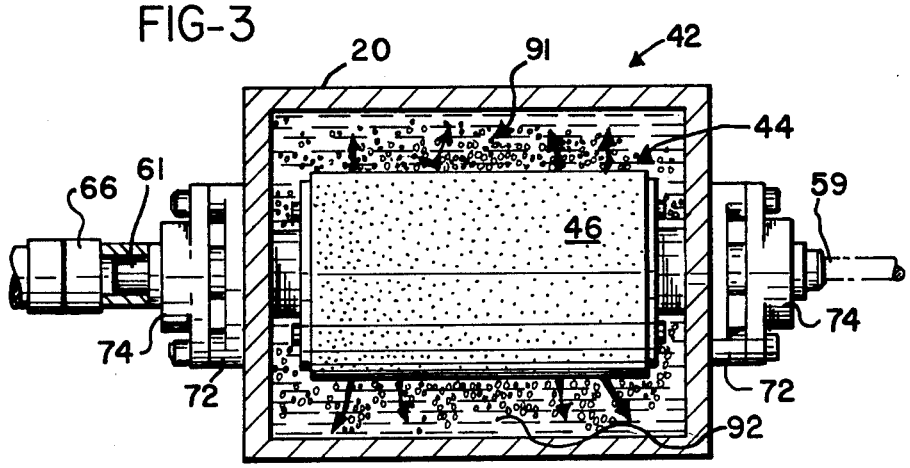
FIG. 3 is an end view of the inlet conduit of the cell of FIG. 2, showing the sparger of the preferred embodiment.

If, as shown in FIG. 3, the sparger 42 is operated so that the porous element 46 is rotated from top to bottom in the Figure, and the fluid flow is in a direction into the surface of the drawing, a variation in relative velocity across the porous element occurs. The upper portion of the porous element 46, which rotates essentially in a direction opposite the flow of fluid through the conduit 20, results in a higher relative velocity of the fluid in area 91 than at the area 92 near the bottom portion of the porous element, which is rotating essentially in the same direction as the fluid flow. The result is that different sizes of bubbles are being generated at the upper and lower portions of the porous element 46, as shown in FIG. 3. This is often desirable since different types of ink particles are attracted to different sizes of bubbles. Furthermore, the large relative velocity of the fluid, especially in area 91, creates a low pressure zone which increases the pressure drop across the porous element to promote air flow through the element to increase bubble formation.

If desired, the shape of the porous member can be altered to create different performance characteristics and provide a wider range in bubble size. For example, in FIG. 6, a porous member 44A has a frustoconical shape and is mounted within the inlet conduit so that its axis of rotation is normal to the flow of fluid through the conduit. In FIG. 7, a porous member 44B which is generally disk-shaped is mounted within the inlet conduit 20 so that it defines an axis of rotation which is normal to the flow of fluid through the conduit. Since the disk-shaped porous member 44B is supported on opposite sides, its entire surface may be made of a porous material. Another configuration is shown in FIG. 8 in which a porous member 44C is mounted within a U-shaped section 20C of the inlet conduit and defines an axis of rotation which is parallel to the fluid flow through the U-shaped section.

Each of the configurations shown in FIGS. 6, 7, and 8 would result in different performance characteristics yielding different ranges of bubble sizes since the relative velocities of different parts of the porous members 44A-44C would yield different bubble sizes. Other types of configurations for a porous member can be developed and yet remain within the scope of the present invention.

As shown in FIG. 1, the flotation apparatus 10 of the preferred embodiment can be incorporated into a tower 93 which provides a series of froth flotation cells for successive deinking of gray stock. Froth flotation apparatus 10 is located at the top of the tower and serves as the first or primary cell. Successive cells 10A, 10B, and 10C are positioned beneath the primary cell and preferably are of identical construction to the primary cell, including spargers 42 and skimmers 28 of the preferred embodiment. The cells 10A-10C each include a foam discharge conduit, similar in construction to conduit 18, and aligned so that the conduits form a vertical column through which the foam discharge from each cell flows downwardly to a foam outlet conduit 94, located at the bottom of the tower 93.

The bottom portion of each discharge conduit 18 preferably includes a frustoconical wall 96 to guide the foam and prevent it from being deposited on the surface of the fluid in the cell beneath it. The outlet conduit 22 of the primary cell 10 forms the inlet conduit 20A of the cell 10A immediately beneath it. Similarly, the outlet conduits 22A and 22B of the cells 10A and 10B, respectively, form the inlet conduits 20B and 20C of cells 10B and 10C, respectively.

In operation, the gray stock is pumped to the inlet conduit 20 of cell 10 where it is aerated by sparger 42 and undergoes the initial deinking process. The foam removed from the surface of the fluid flows downwardly through the discharge conduit 18 and exits the foam outlet conduit 94. The deinked stock accept flows outwardly from the cell 10 in the outlet conduit 22 and into cell 10A through inlet conduit 20A, where it is again aerated by the sparger for the cell 10A. The foam generated is skimmed from the surface of the fluid within the cell 10A falls down the discharge conduits, while the deinked stock accepts flows through outlet conduit 22A and into conduit 20B.

This process is repeated for cells 10B and 10C, where the finally deinked stock accept is conveyed by an outlet conduit (not shown) for further processing. The effluent from cells 10, 10A and 10B flows downwardly to the next succeeding cell by gravity with sufficient force to travel in the requisite vortical pattern in the next succeeding cell to perform the froth flotation process. Additional mechanical pumps are not needed to pump the liquid stock effluent from one cell to the next succeeding cell, thus reducing the overall cost of the tower 92. It may also be desirable to operate the spargers of cells 10A-10C to rotate their porous elements at different speeds, thereby creating different sized bubbles in each cell. Thus, each cell could be adjusted to remove a different type or size of ink particle.

EXAMPLE

A unitary cell froth flotation apparatus constructed in accordance with the preferred embodiment of the invention received an unbleached, ledger grade pulp slurry for deinking which comprised a combination of carbonless business forms, business fliers, and cardboard boxes used in the fast food industry. The waste paper was first pulped in a pulper and used to form a 2% by weight solution of slurry. The slurry was pumped into the vessel at 800 gallons per minute, and the inlet conduit was sized such that the velocity of fluid flow through the conduit was approximately 5.1 feet per second into the vessel.

The porous element of the sparger was rotated at 1800 r.p.m. by a 3 horsepower motor and had an outside diameter of $4\frac{3}{4}$ inches so that the peripheral speed of the porous element was 37.3 feet per second. With a pulp slurry velocity of 5.1 feet per second, the velocity across the top of the roller (as shown in FIG. 3) was 42.4 feet per second and across the bottom of the roller was 32.2 feet per second. The air pressure into the porous member was 10 p.s.i., and the air flow rate was 15 standard cubic feet per minute through the sparger into the pulp slurry. The flow rate through the outlet conduit of the vessel was adjusted to provide a retention time of 2 minutes in the cell for the pulp slurry.

The hole size in the porous element averaged 62 microns, and the resultant bubble diameter varied between 0.7 mm and 2.0 mm. The bubbles made within this range were considered to provide optimum efficiency and performance for the froth flotation apparatus. The process yielded a brightness of 80 to 84 points photovolt for the final product with a lower fines loss than for conventional washers. This brightness level is attributable in part to subsequent treatment which includes the use of pressure screens and centrifugal cleaners.

The components of the froth flotation apparatus 10 are constructed of well known materials which are suitable for contacting the materials and chemicals suspended in the gray stock without corrosion. While the vessel 12, foam discharge conduit 18, and inlet and outlet conduits 20, 22 preferably are made of steel coated with a corrosion-resistant material, the parts of the sparger 42 which support the porous element 46 for rotation are preferably made of stainless steel to resist corrosion and provide desirable wear characteristics. The porous element 46, which preferably is made of sintered bronze, can be made of other porous material such as a ceramic.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. An apparatus for elimination of solid particle impurities contained within a liquid by froth flotation comprising:
   a vessel having a generally cylindrical side wall defining a flotation cell and including an upstanding foam discharge conduit mounted concentrically within said vessel;
   an inlet conduit communicating with said vessel such that fluid flowing through said inlet conduit and into said vessel moves in a vortical fashion within said vessel;
   a fluid outlet conduit communicating with said vessel for conveying fluid therefrom;
   means for skimming foam from an upper surface of fluid within said vessel and displacing foam to said discharge conduit; and
   sparger means for aerating fluid flowing through said inlet conduit including
      a porous member rotatably mounted within said inlet conduit; said porous member having an external surface and defining an interior portion,
      means for conveying gas under pressure to said interior portion of said porous member so that a multiplicity of gas bubbles may be generated as gas flows outwardly through said external surface into fluid flowing through said inlet conduit, and
      means for rotating said porous member such that a relative velocity of fluid flowing in said inlet conduit with respect to said external surface may be increased, thereby reducing a size of bubbles generated.

2. The apparatus of claim 1 wherein said porous member has an axis of rotation oriented normal to a direction of fluid flow through said inlet conduit.

3. The apparatus of claim 2 wherein said porous member further comprises:
   a substantially cylindrical porous element having a central axis which coincides with said axis of rotation; and
   a pair of end stubs extending from opposite ends of said porous element along said axis of rotation, said end stubs rotatably mounted to said inlet conduit such that said porous element is supported at both ends.

4. The apparatus of claim 2 wherein said porous member comprises:
   a porous element having open ends, an interior surface defining said interior portion of said porous member, and an exterior surface defining said external surface of said porous member; and
   a pair of opposing end caps attached to and closing said ends of said porous element.

5. The apparatus of claim 4 wherein said gas conveying means comprises:
   a tubular shaft extending through said end caps and mounted concentrically within said porous element, said shaft having a hollow interior and defining a plurality of holes extending from said hollow interior to an outer surface of said shaft;
   a first end stub mounted to an end of said shaft and having an opposite end adapted to be driven by said means;
   a second end stub mounted to an opposite end of said shaft and defining an opening therethrough communicating with said interior, said second end stub having an end adapted to be coupled to a source of gas under pressure; and
   bearing means mounted on said first and second end stubs for rotatably mounting said shaft in said inlet conduit.

6. The apparatus of claim 5 wherein said porous member is frustoconical in shape.

7. The apparatus of claim 5 wherein said porous member is disk-shaped.

8. The apparatus of claim 5 wherein said porous member has an axis of rotaion oriented parallel to the direction of fluid flow through said inlet conduit.

9. The apparatus of claim 1 wherein said skimming means comprises a roller rotatably mounted to said vessel and extending from said discharge conduit to said side wall of said vessel, said roller positioned within said cell such that foam on the surface of fluid within said vessel moving in a vortical path is collected thereagainst and directed into said discharge conduit, while fluid in said vessel passes beneath said roller, thereby rotating said roller and preventing a buildup of foam on said roller.

10. The apparatus of claim 9 wherein said skimming means further comprises guide means attached to said discharge conduit and said inside surface of said wall and supporting said roller such that said roller may rise and fall with variations in depth of fluid within said vessel.

11. The apparatus of claim 10 wherein said guide means are inclined from the vertical in the direction of vortical fluid flow such that the likelihood of said roller binding against said guide means is minimized.

12. The apparatus of claim 11 wherein said roller is buoyant such that it may float upon fluid within said vessel.

13. The apparatus of claim 12 wherein said roller is substantially cylindrical in shape, having a central axis and an axis of rotation which coincide.

14. The apparatus of claim 13 wherein said roller includes an exterior surface having a plurality of raised ribs extending parallel to said central axis and spaced about said exterior surface.

15. The apparatus of claim 1 further comprising a second vessel defining a second flotation cell, said second vessel being positioned beneath said vessel and including a second foam discharge conduit mounted to receive foam discharge from said discharge conduit; second means for skimming foam from fluid within said second vessel to said second discharge conduit; second sparger means for aerating fluid in said second vessel, and a second inlet conduit communicating with said second vessel and with said fluid outlet conduit of said vessel such that fluid is gravity fed from said vessel to said second vessel with sufficient velocity to flow in a vortical fashion within said second vessel without additional pumping means.

16. In an apparatus for elimination of solid particle impurities contained within a liquid by froth flotation of the type having a vessel defining a flotation cell, means for removing foam from fluid within said cell, inlet conduit means for conveying fluid into said vessel such that the fluid entering said cell travels in a vortical path, and fluid outlet conduit means for conveying fluid from said vessel, an improved sparger for aerating fluid flowing into said vessel comprising:
   a substantially cylindrical porous member mounted for rotation about a central axis within said inlet conduit means, said porous member having an external surface and defining an interior portion and including a multiplicity of pores ranging in size from about 40 to about 70 microns in diameter;

means for conveying gas under pressure to said interior portion of said porous member such that a multiplicity of gas bubbles may be generated as gas flows outwardly through said pores and into fluid flowing through said inlet conduit means; and means for rotating said porous member such that a relative velocity of fluid flowing in said inlet conduit means with respect to said external surface may be increased, thereby reducing a size of bubbles generated.

17. In an apparatus for elimination of solid particle impurities contained within a liquid by froth flotation of the type having a vessel having a generally cylindrical side wall defining a flotation cell, an upstanding foam discharge conduit mounted concentrically within said vessel, means for conveying fluid to said vessel such that fluid in said vessel moves in a vortical fashion, and sparger means for aerating fluid flowing into said vessel, an improved skimmer comprising:

a buoyant roller extending from said discharge conduit to said side wall of said vessel, said roller positioned within said cell such that foam on an upper surface of fluid within said vessel moving in a vortical path is collected thereagainst and directed into said discharge conduit, while fluid in said vessel passes beneath said roller, thereby rotating said roller and preventing a buildup of foam on said roller; and guide means rotatably supporting said roller at said discharge conduit and said side wall such that said roller may rise and fall with a fluid level within said vessel.

18. A method for removing ink and other contaminants from gray stock and the like comprising the steps of:

conveying said gray stock in a slurry along an inlet conduit to a cylindrical vessel defining a flotation cell where said slurry travels in a vortical path;

aerating said slurry by flowing said slurry about a substantially cylindrical porous members mounted for rotation about a central axis with said inlet conduit, said porous member having an external surface and defining an interior portion and including a multiplicity of pores ranging in size from about 40 to about 70 microns in diameter, and introducing air under pressure into said interior portion such that a multiplicity of bubbles is formed in said slurry having a size of between about 0.25 millimeters and about 10 millimeters in diameter, said bubbles adhering to said contaminants and forming foam on a surface of said slurry in said vessel;

removing said foam from said surface; and removing deinked stock from said vessel.

19. The method of claim 18 wherein said aerating step includes rotating said porous member such that a surface of said porous member has a rotational velocity of between about 7 feet per second and about 60 feet per second.

* * * * *

UNITED STATES PATENT AND TRADEMARK OFFICE
CERTIFICATE OF CORRECTION

PATENT NO. : 4,399,028

DATED : August 16, 1983

INVENTOR(S) : Gregory D. Kile et al

It is certified that error appears in the above—identified patent and that said Letters Patent is hereby corrected as shown below:

Claim 8, line 2, "rotaion" should be --rotation--.

Signed and Sealed this

Eighteenth Day of October 1983

[SEAL]

Attest:

GERALD J. MOSSINGHOFF

Attesting Officer

Commissioner of Patents and Trademarks